United States Patent [19]

Yamaguchi et al.

[11] Patent Number: 5,019,970
[45] Date of Patent: May 28, 1991

[54] IC CARD

[75] Inventors: Atsuo Yamaguchi; Kenichi Takahira; Shigeru Furuta; Takesi Inoue; Toshiyuki Matsubara; Shuzo Fujioka, all of Itami, Japan

[73] Assignee: Mitsubishi Denki Kabushiki Kaisha, Japan

[21] Appl. No.: 276,539

[22] Filed: Nov. 28, 1988

[30] Foreign Application Priority Data

Jun. 30, 1988 [JP] Japan ................. 63-160746

[51] Int. Cl.⁵ .................. G06F 12/00; G06F 9/00
[52] U.S. Cl. .................. 364/200; 364/232.8; 364/232.9; 364/238.4; 364/243.0; 364/245.0; 364/246.3
[58] Field of Search ... 364/200 MS File, 900 MS File; 235/380, 382

[56] References Cited

U.S. PATENT DOCUMENTS

| | | | |
|---|---|---|---|
| 4,646,298 | 2/1987 | Laws et al. | 371/16 |
| 4,650,975 | 3/1987 | Kitchener | 235/375 |
| 4,709,137 | 11/1987 | Yoshida | 235/379 |
| 4,748,320 | 5/1988 | Yorimoto et al. | 235/492 |
| 4,755,660 | 7/1988 | Nakano | 235/380 |
| 4,777,355 | 10/1988 | Takahira | 235/380 |
| 4,804,825 | 2/1989 | Bitoh | 235/380 |
| 4,816,656 | 3/1989 | Nakano et al. | 235/380 |
| 4,829,169 | 5/1989 | Watanabe | 235/492 |
| 4,839,506 | 6/1989 | Homma et al. | 235/379 |
| 4,930,129 | 5/1990 | Takahira | 371/40.4 |
| 4,949,298 | 8/1990 | Nakanishi et al. | 364/900 |
| 4,960,982 | 10/1990 | Takahira | 235/382 |
| 4,965,802 | 10/1990 | Shinagawa | 371/51.1 |

OTHER PUBLICATIONS

Manual of Single-Chip 8-Bit CMOS Microcomputer, Mitsubishi Electric pp.2-140.

Primary Examiner—Gareth D. Shaw
Assistant Examiner—Maria Napiorkowski
Attorney, Agent, or Firm—Leydig, Voit & Mayer

[57] ABSTRACT

An IC card includes an addressable CPU having a memory space including a special area including a first plurality of memory addresses which are addressable with a short instruction word, first and second memories in which test and application programs are stored, respectively, a bus which connects the CPU and the first and second memories, a first selection circuit for forming a first memory mapping arrangement in which at least a portion of the first memory is superimposed on the special area, a second selection circuit for forming a second memory mapping arrangement in which at least a portion of the second memory is superimposed on the special area, a detection circuit for detecting the execution of the test program or the application program, and a changeover circuit arranged to selectively operate the first and second selection circuits according to the result of detection executed by the detection circuit. The above-described arrangement makes it possible to effectively use the special area to efficiently execute either the application program or the test program.

2 Claims, 8 Drawing Sheets

IC CARD

BACKGROUND OF THE INVENTION

1. Field of the Invention

The present invention relates generally to IC cards and, more particularly, to an IC card which stores both a test program for performing a test on the IC card itself (a product test) and an application program for performing various functions required for the use of the IC card.

2. Description of the Related Art

Figure 6:
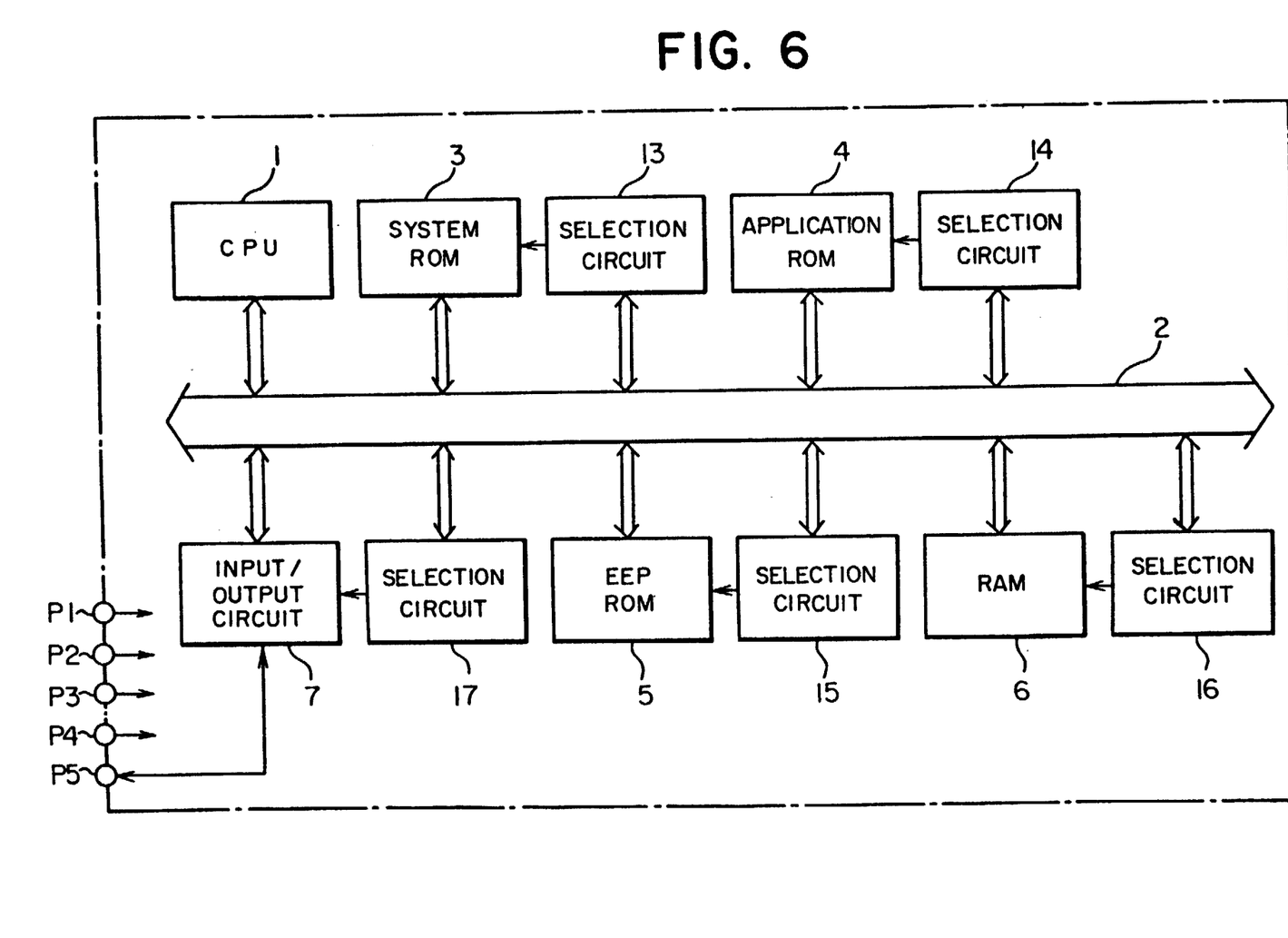
FIG. 6 is a block diagram showing the construction of a conventional of IC card.

FIG. 6 is a block diagram showing the construction of a conventional type of IC card As illustrated, a CPU 1 is connected to both a system ROM 3 and an application ROM 4 through a bus 2.

Figure 7:
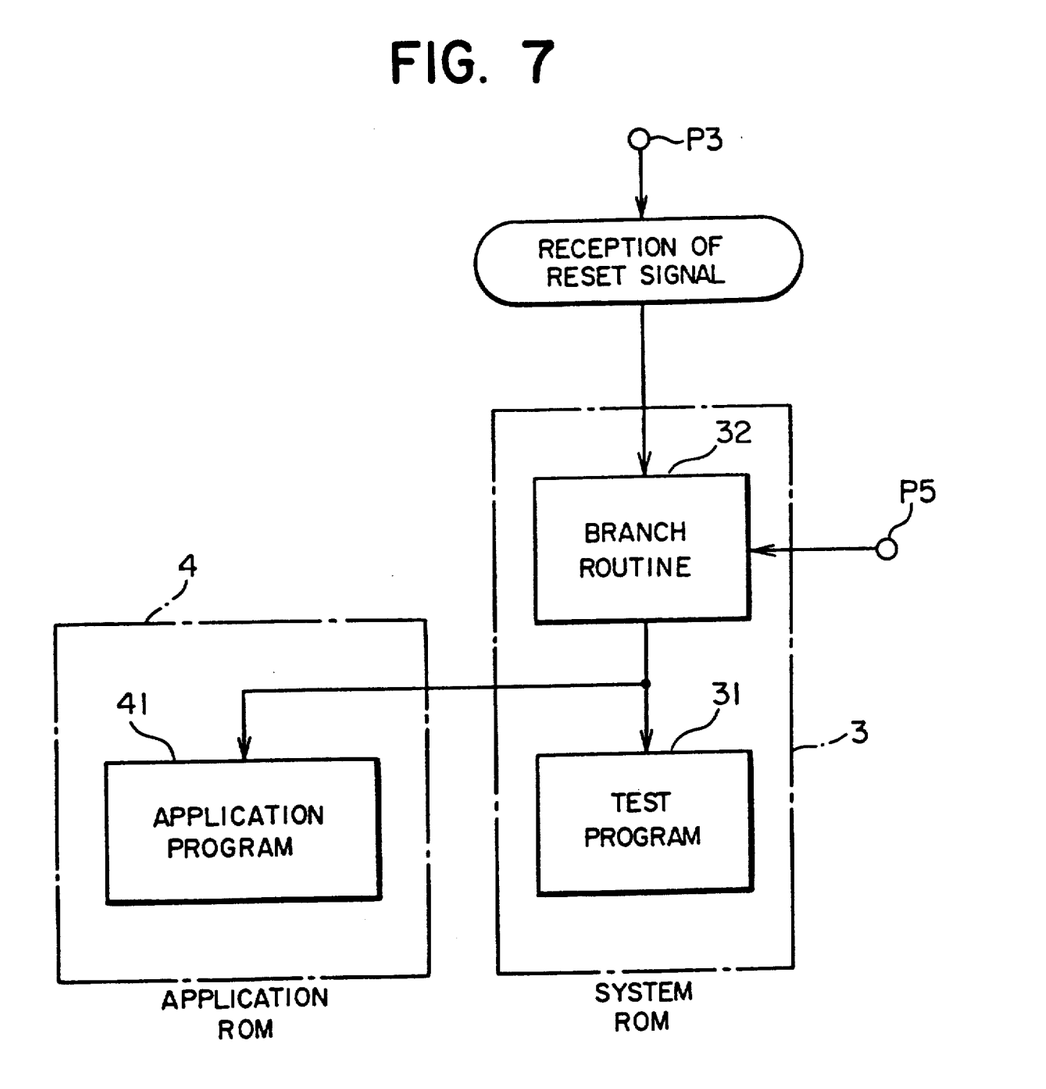
FIG. 7 is a schematic block diagram which illustrates the construction of the system ROM and the application ROM.

As shown in FIG. 7, the system ROM 3 stores a test program 31 for performing a test on the IC card itself, and the application ROM 4 stores an application program 41 for performing various functions which are required for the use of the IC card. The system ROM 3 further stores a branch routine 32 first for determining whether the test program 31 or the application program 41 should be executed and then for branching to the program to be executed.

Referring back to FIG. 6, an EEPROM 5 for storing variable data, a RAM 6 for temporarily storing data, and an input/output circuit 7 for effecting data communication with external equipment are connected to the bus 2.

Figure 8:
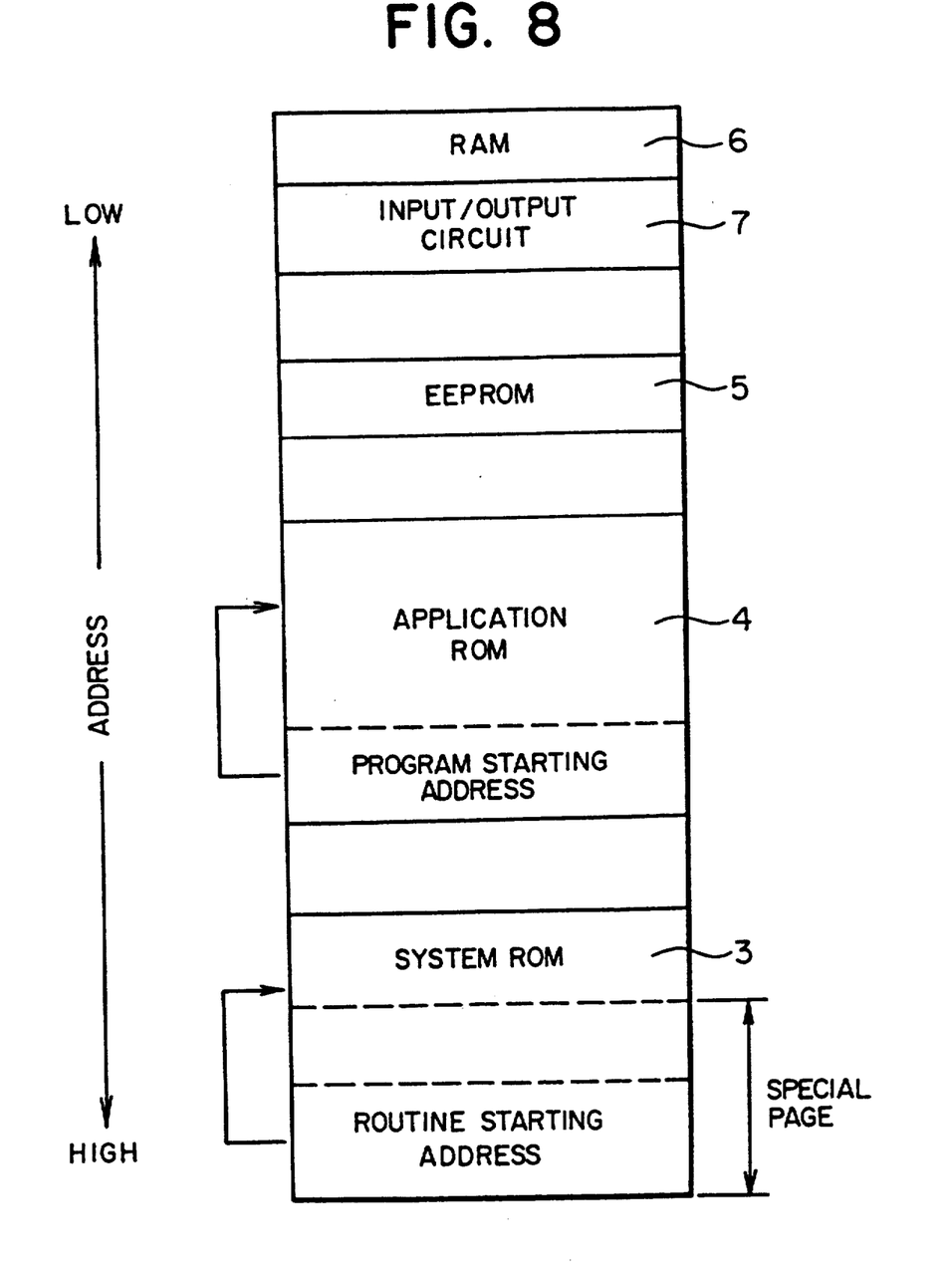
FIG. 8 is a diagram showing a memory arrangement in the conventional of IC card.

As shown in FIG. 8, the system ROM 3, the application ROM 4, the EEPROM 5, the RAM 6 and the input/output circuit 7 are arranged in an identical memory space. It is therefore possible to easily access a desired area of the respective memories with the same type of instruction.

Also, the system ROM 3, the application ROM 4, the EEPROM 5, the RAM 6 and the input/output circuit 7 are respectively connected to selection circuits 13, 14, 15, 16 and 17 to select the corresponding ones of these memories and the input/output circuit 7 on the basis of the arrangement of the memory space shown in FIG. 8 in accordance with the state of the bus 2.

In FIG. 6, a terminal P1 is a positive power input terminal; P2 a grounding terminal for a power source; P3 a reset signal terminal for receiving as its input a reset signal that initializes the CPU 1; P4 a clock terminal for receiving a clock signal as its input; and P5 an I/0 terminal.

Such an IC card operates in the following manner. When a reset signal is input to the IC card through the reset signal terminal P3, the CPU 1 reads out a routine starting address at which execution of the branch routine 32 is initiated, the routine starting address being stored in advance in the system ROM 3 at a predetermined address thereof. The CPU 1 initiates the execution of the branch routine 32 at this routine starting address. If an instruction for executing the test program 31 is input from external equipment (not shown) to the I/0 terminal P5 during the execution of the branch routine 32, the CPU 1 causes the process to proceed from the branch routine 32 to the ensuing test program 31. The test program 31 is provided with a function to access an arbitrary address to enable a satisfactory product test. The CPU 1 accesses individual addresses in accordance with the test program 31, thereby performing a product test.

On the other hand, if no instruction for executing the test program 31 is input, the CPU 1 reads out a program starting address at which execution of the application program 41 is initiated, the program starting address being stored in advance in the application ROM 4 at a predetermined address thereof. The CPU 1 initiates the execution of the application program 41 at this program starting address.

It is known that the above-described IC card utilizes as the CPU 1 a CPU of the type which is provided with a particular area (hereinafter referred to as a "special page") specified in the memory space and which can access the special page with an instruction word which is short compared with the lengths of instruction words used for accessing the remaining areas. The provision of such a special page contemplates an improvement in the efficiency of memory utilization. CPUs provided with the above-described special page functions are especially useful in devices such as IC cards which are required to perform a variety of functions with memories of limited capacity.

However, since such a special page in the memory space is commonly established in an area which is defined by the highest address and the adjacent high addresses as shown in FIG. 8, only a memory which is partially superimposed on the special pages defined by the highest and adjacent high addresses is capable of utilizing the special page, while the remaining memories cannot use it. More specifically, if the system ROM 3 is arranged in the area associated with the highest address as shown in FIG. 8, the special page can be used to perform the test program 31 in the system ROM 3, but the application program 41 in the application ROM 4 which is not superimposed on the special page cannot make use of the special page.

SUMMARY OF THE INVENTION

It is, therefore, an object of the present invention to provide an IC card capable of using a special page to execute either a test program or an application program.

To achieve the above and other objects, in accordance with the present invention, there is provided an IC card comprising a CPU having an addressable memory space including a special area including a first plurality of memory addresses which are addressable by using an instruction word which is short compared with the lengths of instruction words used for addressing memory addresses not within the first plurality; a first memory in which a test program is stored; a second memory in which an application program is stored; a bus connecting the CPU and the first and second memories; first selection means for superimposing a portion of the first memory on the special area; second selection means for superimposing a portion of the second memory on the special area; detection means for detecting which of the test program and the application program is to be executed by the CPU; and changeover means for operating the first selection means when the detection means has detected that the CPU is to execute the test program and for operating the second selection means when the detection means has detected that the CPU is to execute the application program.

In the present invention, the changeover means selectively operates the first and second selection means to effect switching between the first and second memory arrangements in response to detection of whether the test program or the application program is to be executed.

The above and other objects, features and advantages of the present invention will become apparent from the following description of the preferred embodiments thereof, taken in conjunction with the accompanying drawings.

DESCRIPTION OF THE PREFERRED EMBODIMENTS

The preferred embodiments of the present invention will be described below with reference to the accompanying drawings wherein the same constituent elements are indicated by like reference numerals.

Figure 1:
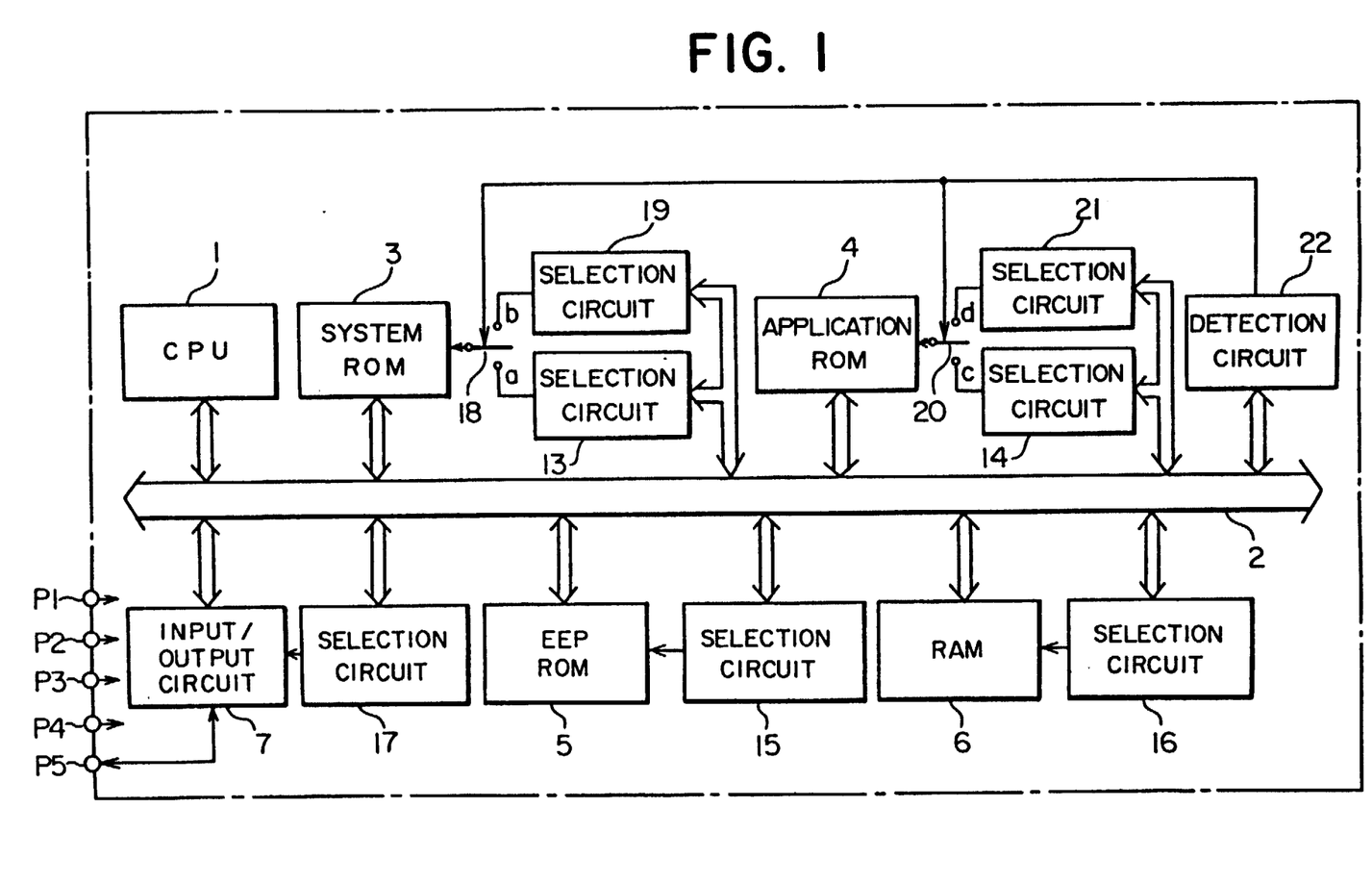
FIG. 1 is a block diagram showing the construction of an IC card according to a first embodiment of the present invention.

FIG. 1 is a block diagram showing the construction of an IC card according to a first embodiment of the present invention. The illustrated IC card includes a CPU 1. A system ROM 3 serving as a first memory and an application ROM 4 serving as a second memory are connected to the CPU 1 through a bus 2. Furthermore, an EEPROM 5 for storing variable data, a RAM 6 for temporarily storing data and an input/output circuit 7 for effecting data communication with external equipment (not shown) are connected to the bus 2.

Figures 2A, 2B:
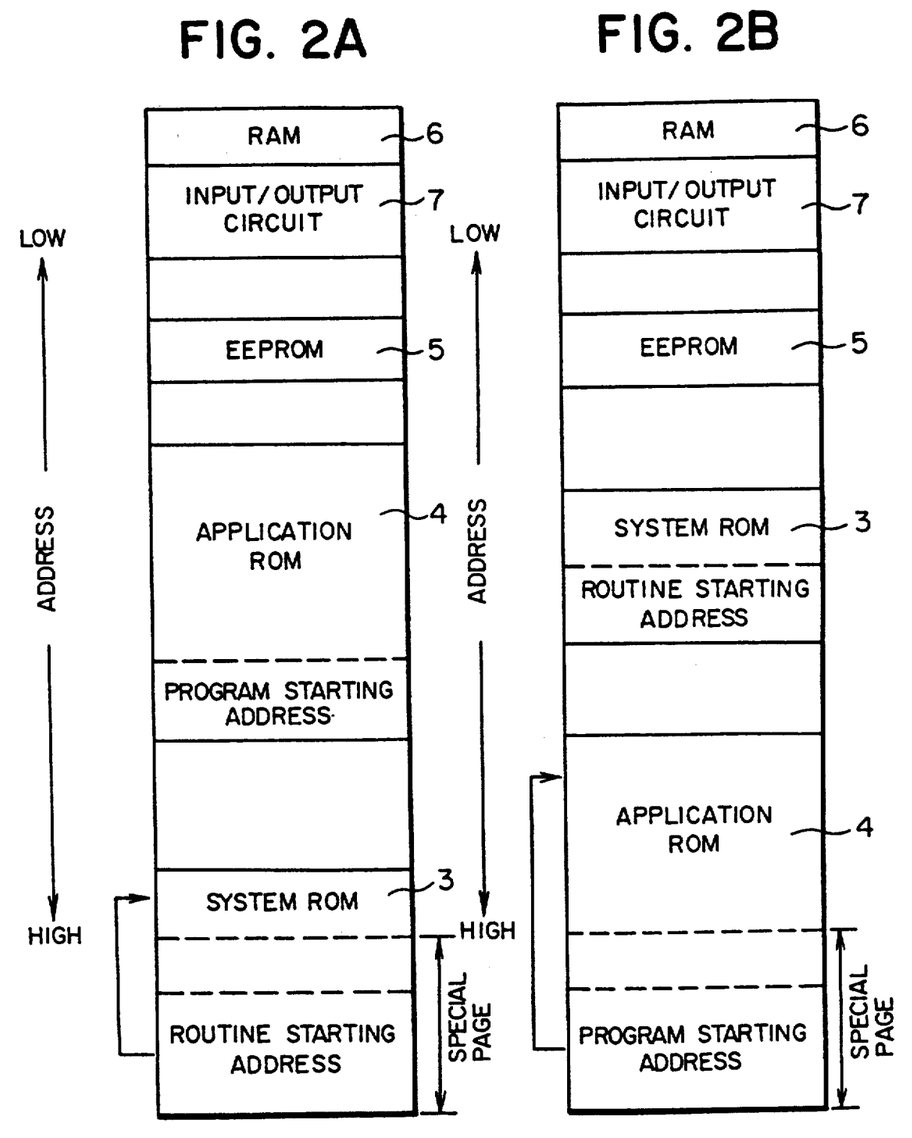
FIG. 2A is a diagram showing a normal memory arrangement according to the first embodiment.
FIG. 2B is a diagram showing a memory arrangement for the execution of an application program according to the first embodiment.

As shown in FIGS. 2A and 2B, the CPU 1 is provided with a special page in the memory space, and the special page is established in an area defined by the highest address and the adjacent high addresses. The CPU 1 can access the special page alone by using an instruction word which is short compared with the lengths of instruction words used for accessing the remaining areas.

The system ROM 3 stores a test program for performing a test on the IC card itself, and the application ROM 4 stores an application program for performing various functions which are required for the use of the IC card. The system ROM 3 further stores a branch routine for first determining whether the test program or the application program should be executed and for branching to the program to be executed.

As shown in FIG. 1, selection circuits 15, 16 and 17 are connected to the EEPROM 5, the RAM 6 and the input/output circuit 7, respectively. The selection circuits 15, 16 and 17 select the corresponding memories 5 and 6 or the input/output circuit 7 according to the state of the bus 2.

Selection circuits 13 and 19 are selectively connected to the system ROM 3 by a changeover switch 18, while selection circuits 14 and 21 are selectively connected to the application ROM 4 by a changeover switch 20. The selection circuits 13 and 14 comprise a first selection means for selecting a first memory arrangement between the two memory arrangements in accordance with the state of the bus 2. In the first memory arrangement shown in FIG. 2A, the system ROM 3 is partially superimposed on the special page defined by the highest address and the adjacent high addresses and the application ROM 4 is arranged in an area defined by addresses lower than those of the system ROM 3. The selection circuits 19 and 21 comprise a second selection means for selecting a second memory arrangement between the two arrangements in accordance with the state of the bus 2. In the second memory arrangement shown in FIG. 2B, the application ROM 4 is partially superimposed on the special page defined by the highest address and the adjacent high addresses and the system ROM 3 is arranged in an area defined by addresses lower than those of the application ROM 4. Also, the two changeover switches 18 and 20 comprise a changeover means.

As shown in FIG. 1, a detection circuit 22 is connected to the bus 2. The detection circuit 22 is arranged to detect through the bus 2 whether the CPU 1 has read out the program starting address of the application program in the application ROM 4. The detection circuit 22 actuates the changeover switches 18 and 20 on the basis of the detection result. More specifically, the detection circuit 22 normally keeps the changeover switches 18 and 20 switched to contacts a and c, respectively. If the detection circuit 22 detects the fact that the CPU 1 has read out the program starting address of the application program, the detection circuit 22 switches the changeover switches 18 and 20 to contacts b and d, respectively.

Like the conventional example shown in FIG. 6, the present IC card is also provided with the positive power input terminal P1, the power source grounding terminal P2, the reset signal terminal P3, the clock terminal P4, and the I/O terminal P5.

The routine starting address of the branch routine in the first memory arrangement shown in FIG. 2A is stored in a predetermined area in the system ROM 3. The program starting address of the application program in the second memory arrangement shown in FIG. 2B is stored in a predetermined area in the application ROM 4.

The operation of the first embodiment will be described below.

A reset signal is applied to the input of the reset signal terminal P3. At this time, since the changeover switches 18 and 20 are connected to the contacts a and c, respectively, the selection circuits 13 and 14 are connected to the system ROM 3 in the application ROM 4, respectively, and the first memory arrangement shown in FIG. 2A. Then, the CPU 1 reads out the routine starting address of the branch routine which is stored at a predetermined address in the system ROM 3. The CPU 1 initiates the execution of the branch routine at the routine starting address.

In the branch routine, the state of the I/O terminal P5 is first checked to determine the presence or absence of an instruction for executing a product test. If the instruction for executing the product test is detected, the test program is executed subsequently to the branch routine. In this case, since the system ROM 3 is partially superimposed on the special page, it is possible to effectively use the special page to execute the test program efficiently.

On the other hand, if the instruction for executing the product test is not input, the CPU 1 reads out the program starting address of the application program which is stored at a predetermined address in the application ROM 4 in order to cause the process to proceed from the branch routine to the application program in the application ROM 4. At this time, the detection circuit 22 detects that the CPU 1 has read out the program starting address of the application program, so that the detection circuit 22 switches the changeover switches 18 and 20 to the contacts b and d, respectively. Thus, the selection circuits 19 and 21 are connected to the system ROM 3 in the application ROM 4, respectively, and the second memory arrangement shown in FIG. 2B. In other words, the application ROM 4 is partially superimposed on the special page.

In such a state, the CPU 1 executes the application program. Accordingly, since the application program can be executed using the special page, it is possible to execute the application program efficiently.

Figure 3:
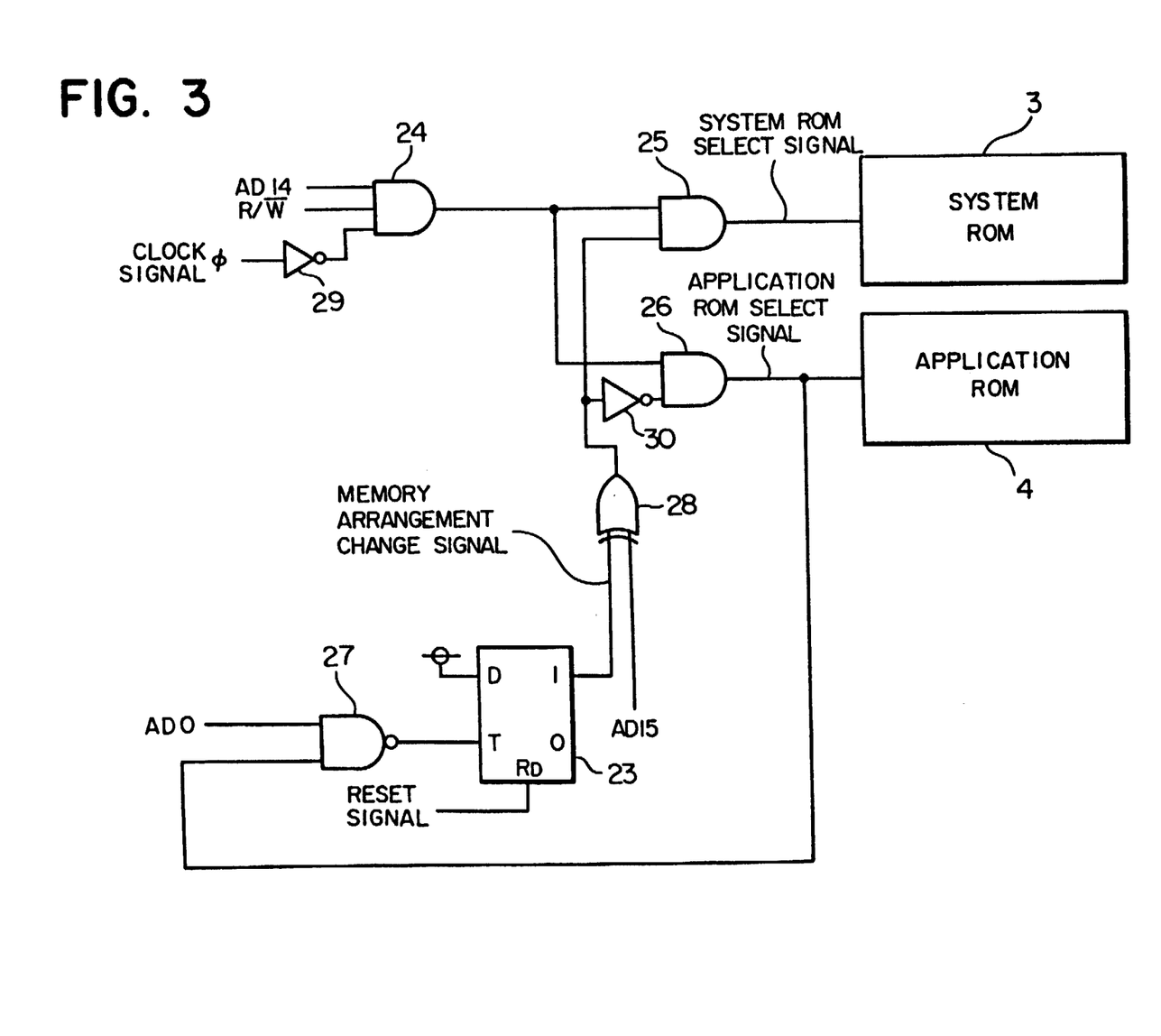
FIG. 3 is a circuit diagram showing a portion of a second embodiment.

FIG. 3 is a circuit diagram showing the concrete construction of the first and second selection means, the detection means and the changeover means. The illustrated circuit is constituted by a flip-flop circuit 23, AND circuits 24 to 26, a NAND circuit 27, an EXCLUSIVE-OR circuit 28 and inverter circuits 29, 30. The circuit of FIG. 3 provides control over the selection between the system ROM 3 and the application ROM 4 according to a specified address in the memory space having addresses of four-digit hexidecimal numbers (i.e., of 16-bit construction).

Figures 4A, 4B:
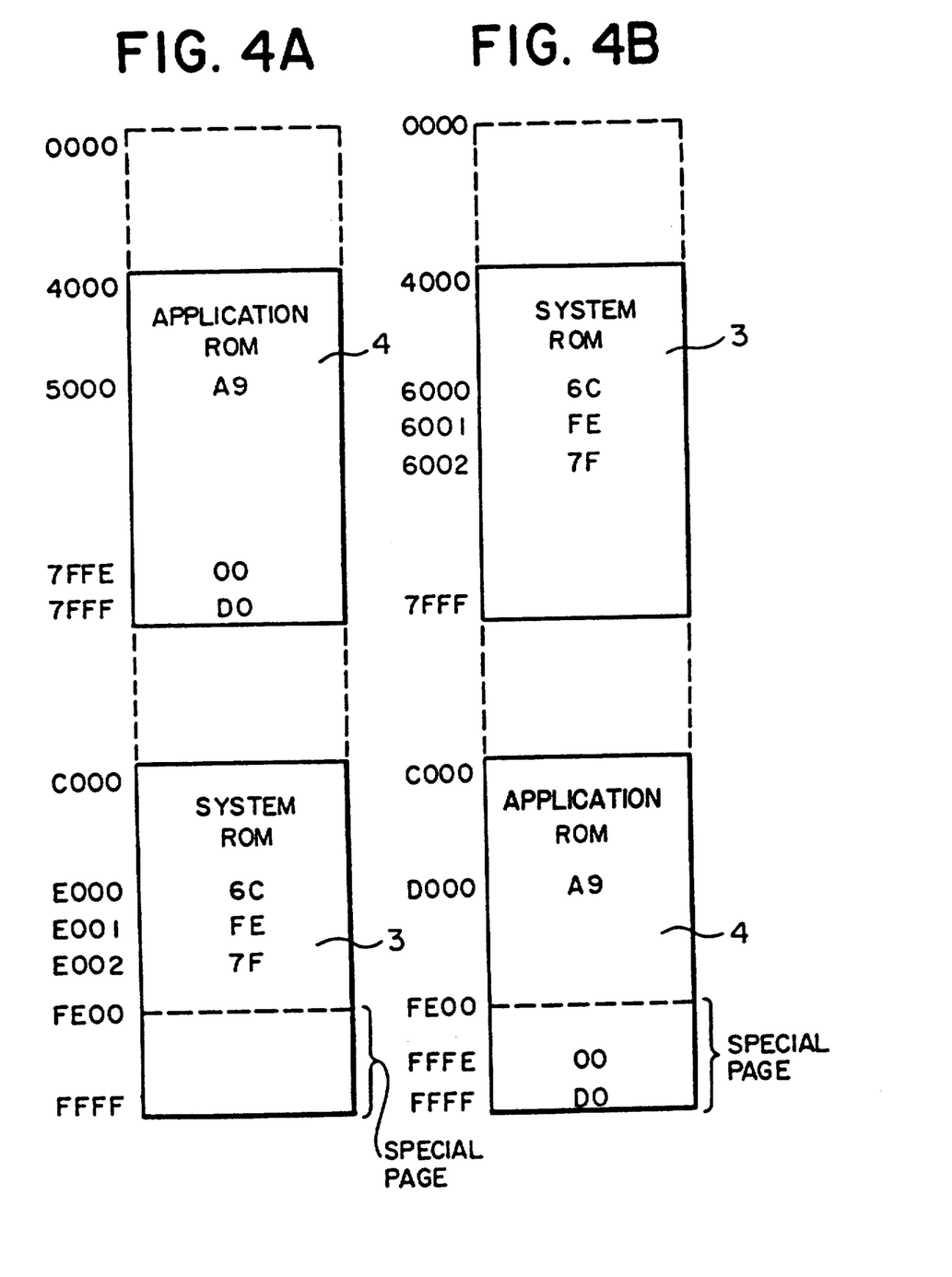
FIG. 4A is a diagram showing a normal memory arrangement according to the second embodiment.
FIG. 4B is a diagram showing a memory arrangement for the execution of an application program according to the second embodiment.

FIG. 4A shows the first memory arrangement which is normally selected. In the first memory arrangement, the application ROM 4 is arranged in an area defined by addresses 4000 to 7FFF and the system ROM 3 is arranged in an area defined by addresses C000 to FFFF. For the execution of the application program, the second memory arrangement shown in FIG. 4B is selected. In the second memory arrangement, the system ROM 3 is arranged in an area defined by addresses 4000 to 7FFF, and the application ROM 4 is arranged in an area defined by addresses C000 to FFFF. The program starting address of the application program in the application ROM 4 is D000 in the second memory arrangement shown in FIG. 4B, and an initial instruction A9 in the application program is stored at address D000. In the normal arrangement (the first memory arrangement shown in FIG. 4A), this program starting address D000 is stored at addresses 7FFE and 7FFF in the application ROM 4. Of these addresses at which is stored the program starting address D000 of the application program, the lower address 7FFE is stored at addresses E001 and E002 in the system ROM 3. A jump instruction 6C stored at address E000, which is contiguous to the address E001 in the downward direction, enables the process to jump from addresses 7FFE and 7FFF to the program starting address D000 of the application program shown in FIG. 4B.

Figure 5:
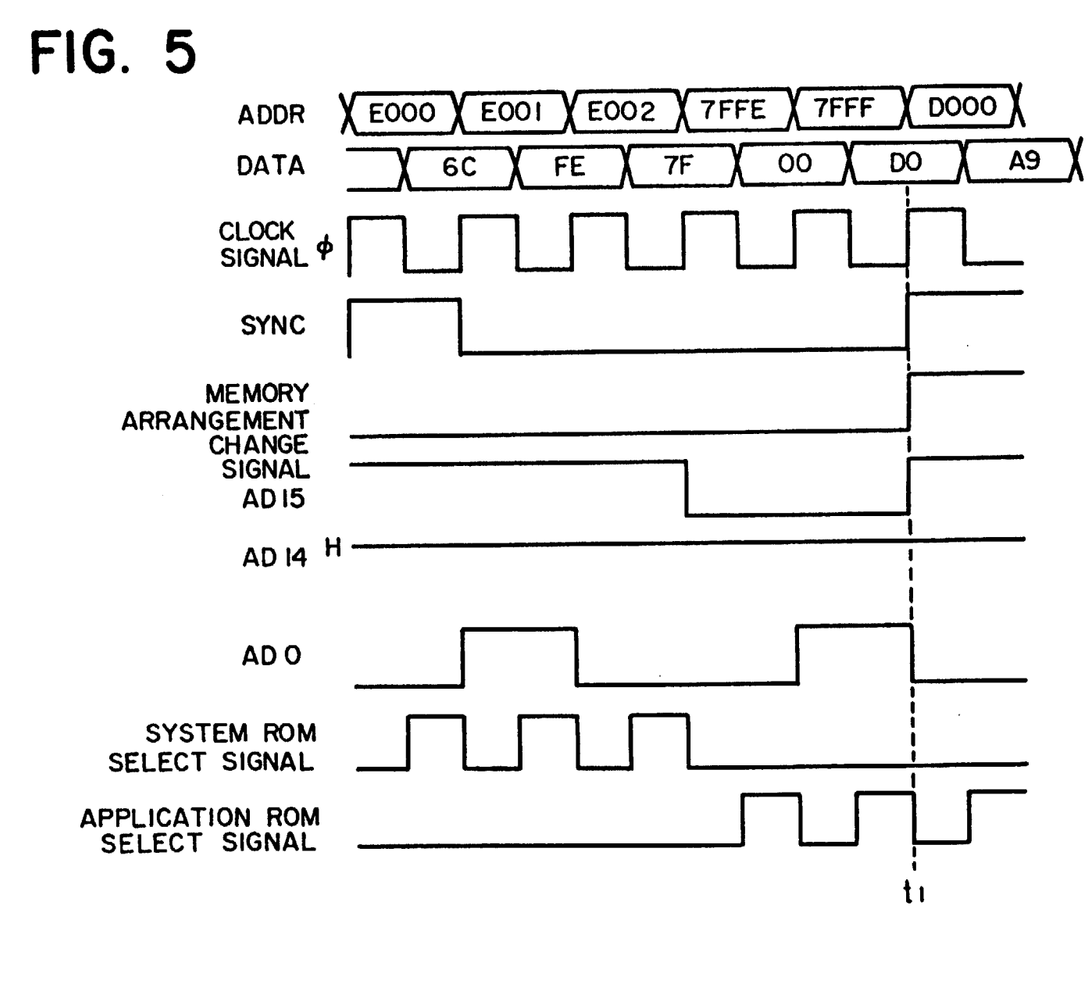
FIG. 5 is a timing chart showing the operation of the second embodiment.

The operation of the circuit shown in FIG. 3 will be described below with reference to the timing chart of FIG. 5.

When the power source is switched on and a reset signal is input to the terminal $R_D$ of the flip-flop circuit 23, the flip-flop circuit 23 is reset and a memory arrangement change signal goes to a low level. At this time, the memory arrangement is in the state shown in FIG. 4A. The two high-order bits AD14 and AD15 of each address which contains the 16 bits from AD0 (the lowest order bit) to AD15 (the highest order bit) are necessarily at the high level in the area of the system ROM 3 which is designated by addresses C000 to FFFF. Accordingly, when an arbitrary address from addresses C000 to FFFF is specified through a corresponding bus (not shown), high-level signals are, as shown in FIG. 3, input to the AND circuit 25 through both the EXCLUSIVE-OR circuit 28 and the AND circuit 24. Then, a high-level system ROM select signal is input from the AND circuit 25 to the system ROM 3. Thus, the system ROM 3 is selected.

If an arbitrary address is specified from addresses 4000 to 7FFF which define the area of the application ROM 4, a high-level application ROM select signal is input to the application ROM 4 through the EXCLUSIVE-OR circuit 28, the inverter circuit 30 and the AND circuits 24, 26 since the two high-order bits AD14 and AD15 of each 16-bit address in such an area are at the high level and the low level, respectively. Thus, the application ROM 4 is selected.

In the branch routine in the system ROM 3 according to the first memory arrangement shown in FIG. 4A, branching to the application program in the application ROM 4 is effected as follows. First, the jump instruction 6C at address E000 is read, then address 7FFE stored at addresses E001 and E002 is read in accordance with the instruction 6C, and then address 7FFE and the following address 7FFF are sequentially specified. Since the thus-specified addresses 7FFE and 7FFF are located in the area of the application ROM 4, the high-level application ROM select signal is output from the AND circuit 26 as described above, whereby the application ROM 4 is selected.

Furthermore, at time $t_1$ at which the program starting address D000 of the application ROM 4 which is stored at addresses 7FEE and 7FFF is read, a low-level signal is input from the NAND circuit 27 to the flip-flop circuit 23 (FIG. 3) since both the lowest order bit AD0 that designates address 7FFF and the application ROM select signal are at the high levels. Thus, the memory arrangement change signal output from the flip-flop circuit 23 is inverted to a high level, and subsequently the memory arrangement change signal is maintained at the high level until a reset signal is again input to the flip-flop circuit 23. Accordingly, if the program starting address D000 in the application ROM 4 is specified, the EXCLUSIVE-OR circuit 28 outputs a low-level signal since the highest bit AD15 which designates address D000 is at the high level. Thus, the application ROM select signal goes to a high level, and the application ROM 4 is selected.

As described above, when the memory arrangement change signal goes to the high level, the application ROM 4 is selected by specifying the area designated by addresses C000 to FFFF each having the highest bit AD15 in the high-level state. On the other hand, if the area designated by addresses 4000 to 7FFF each having the highest bit AD 15 in the low-level state is specified, the system ROM 3 is selected, that is, the first memory arrangement is changed to the second memory arrangement shown in FIG. 4B.

In this manner, the instruction A9 stored at address D000 in the application ROM 4 in the second memory arrangement shown in FIG. 4B is read out, and the execution of the application program is initiated. At this time, since the application ROM 4 is partially superimposed on the special page, it is possible to effectively use the special page to execute the application program efficiently.

It is to be noted that the first and second embodiments shown in FIGS. 1 to 5 are intended for the purpose of illustration only, and the present invention is not limited to such embodiments.

In the above-described embodiment, the first memory arrangement of FIG. 2A which is the normal arrangement is switched to the second memory arrangement of FIG. 2B only when the application program is to be executed. However, the relationship between the first and second arrangements may be reversed. That is, the second memory arrangement may be the normal arrangement and, only when the test program is to be executed, the second memory arrangement may be switched to the first memory arrangement.

What is claimed is:

1. An IC card comprising:

a CPU having an addressable memory space including a plurality of memory addresses, each memory address being uniquely addressable by means of at least one of a plurality of instruction words, each instruction word having a predetermined length, the addressable memory space including a special page including a plurality of special memory addresses which are addressable by instruction words which are shorter in length than the instruction words used for addressing memory addresses not included in the special page;

a first memory for storing a first program for execution by said CPU, said first memory including a starting address in which is stored a first instruction of the first program;

a second memory for storing a second program for execution by said CPU, said second memory including a starting address in which is stored a first instruction of the second program and a predetermined address, wherein said CPU is programmed to address the predetermined address prior to executing the second program;

a bus connecting said CPU to said first and second memories;

selection means connected to said bus and said first and second memories and having a first state and a second state and for enabling, in the first state, said first memory when said CPU addresses a first range of memory addresses and said second memory when said CPU addresses a second range of memory addresses, and for enabling, in the second state, said first memory when said CPU addresses a third range of memory addresses and said second memory when said CPU addresses a fourth range of memory addresses, wherein the first and fourth ranges at least partially include the special page and said selection means is normally in the first state;

detection means connected to said bus for detecting when said CPU addresses the predetermined address of said second memory, thereby indicating that said CPU is about to execute the second program, and for producing a changeover signal in response thereto; and changeover means connected to said detection means and said first and second memories and connected for switching said selection means to the second state from the first state in response to the changeover signal, whereby the second program in said second memory may be addressed in the special page by a shorter instruction word.

2. An IC card according to claim 1 wherein the predetermined address of said second memory stores the starting address of the second program, and said CPU is programmed to read the starting address of the second program prior to executing the second program.

* * * * *